United States Patent
Ishihara et al.

(10) Patent No.: US 12,357,992 B2
(45) Date of Patent: Jul. 15, 2025

(54) PARTICLE DISCRIMINATION MECHANISM

(71) Applicants: University Public Corporation Osaka, Osaka (JP); NATIONAL UNIVERSITY CORPORATION HOKKAIDO UNIVERSITY, Sapporo (JP); DAICEL CORPORATION, Osaka (JP)

(72) Inventors: Hajime Ishihara, Sakai (JP); Takudo Wada, Sakai (JP); Keiji Sasaki, Sapporo (JP); Yuto Makino, Tokyo (JP)

(73) Assignees: UNIVERSITY PUBLIC CORPORATION OSAKA, Osaka (JP); NATIONAL UNIVERISTY CORPORATION HOKKAIDO UNIVERSITY, Hokkaido (JP); DAICEL CORPORATION, Osaka (JP)

( * ) Notice: Subject to any disclaimer, the term of this patent is extended or adjusted under 35 U.S.C. 154(b) by 0 days.

(21) Appl. No.: 18/288,525

(22) PCT Filed: Mar. 14, 2022

(86) PCT No.: PCT/JP2022/011228
§ 371 (c)(1),
(2) Date: Oct. 26, 2023

(87) PCT Pub. No.: WO2022/239450
PCT Pub. Date: Nov. 17, 2022

(65) Prior Publication Data
US 2025/0065330 A1    Feb. 27, 2025

(30) Foreign Application Priority Data
May 12, 2021 (JP) .................. 2021-080858

(51) Int. Cl.
*B01L 3/00* (2006.01)

(52) U.S. Cl.
CPC . *B01L 3/502761* (2013.01); *B01L 2200/0652* (2013.01); *B01L 2300/168* (2013.01); *B01L 2400/0454* (2013.01)

(58) Field of Classification Search
CPC ....... B01L 3/502761; B01L 2200/0652; B01L 2300/168; B01L 2400/0454
(Continued)

(56) References Cited

U.S. PATENT DOCUMENTS

| 11,367,539 | B2* | 6/2022 | Zheng | G21K 1/006 |
| 2014/0220557 | A1* | 8/2014 | Hart | G01N 33/4833 435/7.1 |
| 2015/0380120 | A1 | 12/2015 | Wereley et al. | |

FOREIGN PATENT DOCUMENTS

| JP | 2001-242080 A | 9/2001 |
| JP | 2013-198854 A | 10/2013 |
| JP | 2020-34501 A | 3/2020 |

OTHER PUBLICATIONS

International Preliminary Report on Patentability and English translation of the Written Opinion of the International Searching Authority for International Application No. PCT/JP2022/011228, dated Nov. 23, 2023.
International Search Report for International Application No. PCT/JP2022/011228, Mailed Nov. 23, 2023.
(Continued)

*Primary Examiner* — Michael McCullough
*Assistant Examiner* — Jessica L Burkman
(74) *Attorney, Agent, or Firm* — Birch, Stewart, Kolasch & Birch, LLP

(57) ABSTRACT

A particle discrimination mechanism includes: a channel in which a plurality of first nanoparticles each including an absorber having a predetermined absorption level and a plurality of second nanoparticles each of which does not include the absorber having the predetermined absorption level exist, the channel including a first input section and a second input section; a laser that outputs first light, which is
(Continued)

absorbed by the absorber having the predetermined absorption level, in a direction from the first input section toward the second input section; a laser that outputs second light, which is not absorbed by the absorber having the predetermined absorption level but is scattered or absorbed by the second nanoparticles, in a direction from the second input section toward the first input section.

3 Claims, 9 Drawing Sheets

(58) Field of Classification Search
USPC .......................................................... 209/2
See application file for complete search history.

(56) References Cited

OTHER PUBLICATIONS

Wada et al., "Kinetic Transport and Optical-Constant Measurement of Nanoparticles in a Restricted Dimension by Optical Pressure," The Japan Society of Applied Physics, 2018, with English translation (Abstract only).

Extended European Search Report for European Application No. 22807157.7, dated Feb. 18, 2025.

Fujiwara et al., "Optical selection and sorting of nanoparticles according to quantum mechanical properties," Science Advances, vol. 7, eabd9551, 2021, pp. 1-5.

Pin et al., "Nanodiamond optical sorting at the femtonewton scale inside a tapered glass capillary," Proc. of SPIE, vol. 11637, pp. 116370Q-1-116370Q-6, 2021.

\* cited by examiner (a)

(b)

(a)

(b)

(a)

(b)

PARTICLE DISCRIMINATION MECHANISM

TECHNICAL FIELD

One aspect of the present invention relates to a particle discrimination mechanism.

BACKGROUND ART

As methods for discriminating fine particles, for example, a centrifugal separation method described in Patent Literature 1, chromatography, and the like are known.

CITATION LIST

Patent Literature

Patent Literature 1: Japanese Unexamined Patent Publication No. 2013-198854

SUMMARY OF INVENTION

Technical Problem

Here, there is a case where two types of fine particles to be discriminated do not differ from each other in terms of, for example, chemical and physical properties of surfaces or masses and volumes (have no difference to the extent that the both can be discriminated). In this case, it is difficult to appropriately discriminate the two types of fine particles by the centrifugal separation method or chromatography as described above. For example, in a case where it is desired to discriminate a nanodiamond including a nitrogen-vacancy (NV) center and a nanodiamond including no NV center, it is difficult to appropriately discriminate these two types of nanodiamonds by the centrifugal separation method or chromatography as described above because chemical and physical properties of surfaces of these two types of nanodiamonds do not differ from each other.

One aspect of the present invention has been made in view of the above circumstances, and an object thereof is to appropriately discriminate two types of particles whose surfaces do not differ from each other in scientific and physical properties.

Solution to Problem

A particle discrimination mechanism according to one aspect of the present invention includes: a channel in which a plurality of first nanoparticles each including an absorber having a predetermined absorption level and a plurality of second nanoparticles each of which does not include the absorber having the predetermined absorption level exist, the channel including a first input section and a second input section; a first light source module that outputs first light, which is absorbed by the absorber having the predetermined absorption level, in a direction from the first input section toward the second input section; and a second light source module that outputs second light, which is not absorbed by the absorber having the predetermined absorption level but is scattered or absorbed by the second nanoparticles, in a direction from the second input section toward the first input section.

With the particle discrimination mechanism according to the one aspect of the present invention, the plurality of first nanoparticles each including the absorber having the predetermined absorption level are easily transported in the direction from the first input section toward the second input section by the first light absorbed by the absorber. On the other hand, the plurality of second nanoparticles each of which does not include the absorber having the predetermined absorption level are easily transported in the direction from the second input section toward the first input section by the second light scattered or absorbed by the second nanoparticles. As a result, positions of the first nanoparticles including the absorbers and the second nanoparticles not including the absorbers after the transportation are easily separated, and the first nanoparticles and the second nanoparticles can be appropriately discriminated. Such a discrimination method can also be carried out for two types of particles whose surfaces do not differ from each other in scientific and physical properties. Therefore, with the particle discrimination mechanism according to the one aspect of the present invention, it is possible to appropriately discriminate the two types of particles whose surfaces do not differ from each other in scientific and physical properties.

The particle discrimination mechanism may further include a controller that controls light outputs of the first light source module and the second light source module, and the controller may control the first light source module and the second light source module to adjust intensities and frequencies of the first light and the second light are adjusted such that the first nanoparticles are transported in the direction from the first input section toward the second input section and the second nanoparticles are transported in the direction from the second input section toward the first input section. The first nanoparticles and the second nanoparticles can be more reliably discriminated by adjusting the intensity and frequency of each beam of the light in this manner.

The channel may include: a first portion extending from the first input section to a first junction in a first direction; a second portion extending from the first junction to the second input section in a second direction intersecting the first direction; a third portion extending from the second input section to a second junction in the first direction and in a direction approaching the first input section in the first direction; a fourth portion extending from the second junction to a third junction included in the first portion; a first mirror that is provided at the first junction, reflects the first light from the first portion toward the second portion, and reflects the second light from the second portion toward the first portion; a second mirror that is provided at the second input section and reflects the first light from the second portion toward the third portion; and a third mirror that is provided at the second junction and reflects the first light from the third portion toward the fourth portion.

In such a structure, a ring structure is formed by a channel of the first portion extending from the third junction to the first junction, a channel of the second portion extending from the first junction to the second input section, a channel of the third portion extending from the second input section to the second junction, and a channel of the fourth portion extending from the second junction to the third junction. Then, the first light and the second light pass through the first portion and the second portion in directions opposite to each other, and only the first light passes through the third portion and the fourth portion. Therefore, the first nanoparticles and the second nanoparticles are transported only by the first light in a channel, which corresponds to the third portion and the fourth portion, from the second input section to the third junction via the second junction. Then, optical pressures of the first light and the second light traveling in the opposite directions act on the first nanoparticles and the second nanoparticles reaching the third junction (a point included in the first portion). Here, since the first light is absorbed by the absorber having the predetermined absorption level and the second light is not absorbed, the first light becomes dominant, and the first nanoparticles are repeatedly transported by the first light in a channel (channel returning from the third junction to the third junction via the first junction, the second input section, and the second junction) having the above-described ring structure. On the other hand, since the second nanoparticles do not include the absorber, the first light is not absorbed, and the first light is not dominant as compared with the first nanoparticles. Thus, particles transported in the direction from the third junction toward the first input section and particles transported in the channel having the ring structure exist together. However, when reaching the third junction again, the second nanoparticles transported in the channel of the ring structure are divided again into particles to be transported in the direction from the third junction toward the first input section and particles to be transported in the channel of the ring structure. Thus, when sufficient time elapses by repeating such processing, most of the second nanoparticles are transported in the direction toward the first input section. Since transport by a long distance for a long time is achieved by the ring structure in this manner, the first nanoparticles can be repeatedly transported in the channel of the ring structure, and the second nanoparticles can be transported to a channel outside the ring structure. Thus, the first nanoparticles and the second nanoparticles can be appropriately discriminated by separating regions where the first nanoparticles and the second nanoparticles exist. In addition, since the first nanoparticles are concentrated in the channel (circulating portion) having the ring structure, the first nanoparticles can be easily collected.

The first nanoparticles may be nanodiamonds each of which includes an NV center that is the absorber, and the second nanoparticles may be nanodiamonds each of which does not include the NV center that is the absorber. Since the nanodiamonds including the NV centers and the nanodiamonds not including the NV centers are discriminated by the particle discrimination mechanism according to the one aspect of the present invention, it is possible to appropriately collect elements in the quantum information technology and nanodiamonds including the NV centers that are highly valuable as highly sensitive sensing materials including bioapplications.

Advantageous Effects of Invention

According to one aspect of the present invention, it is possible to appropriately discriminate two types of particles whose surfaces do not differ from each other in scientific and physical properties.

DESCRIPTION OF EMBODIMENTS

Hereinafter, an embodiment will be described in detail with reference to the drawings. The same elements or elements having the same function will be denoted by the same reference signs in the description, and redundant descriptions will be appropriately omitted.

Figure 1:
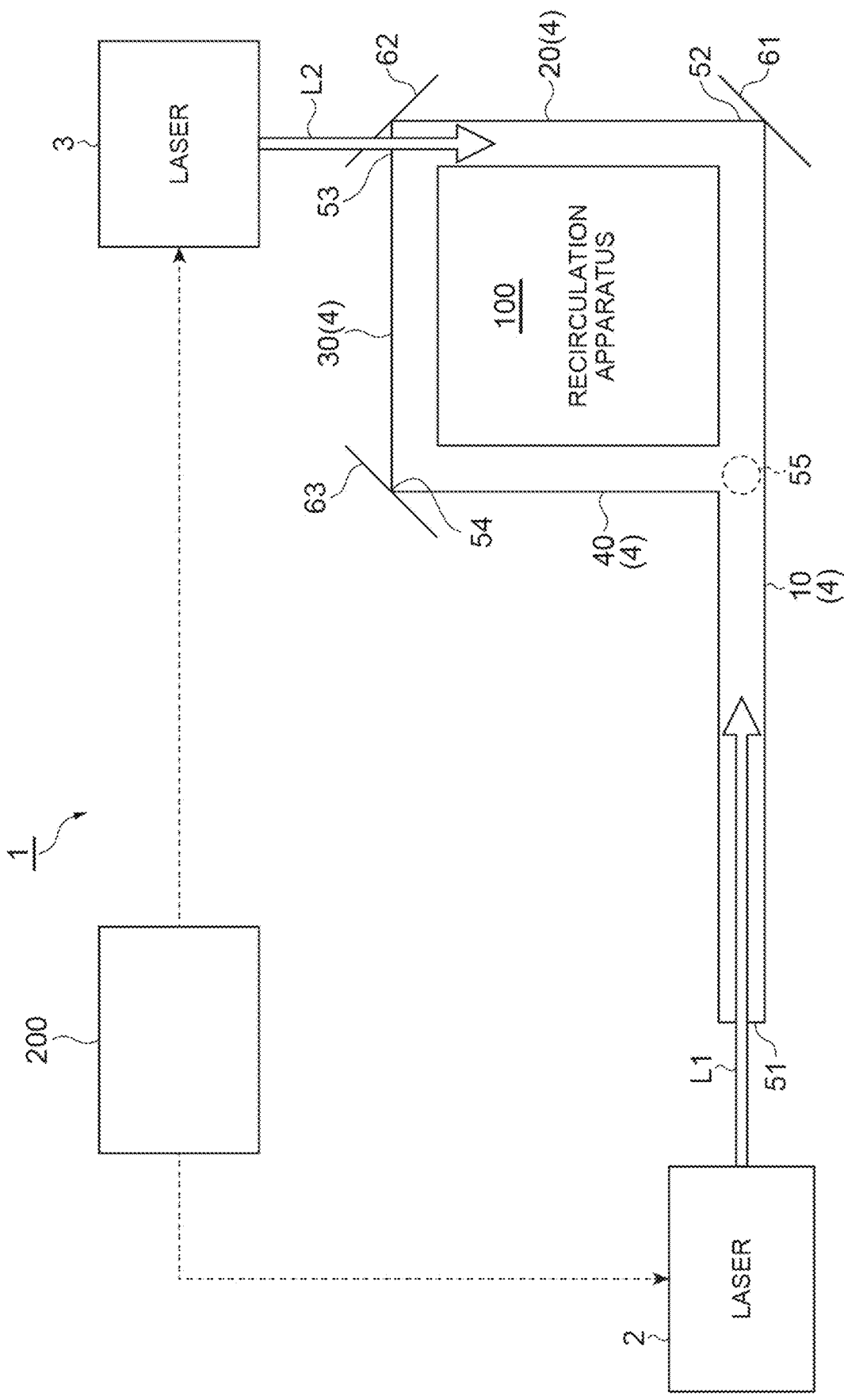
FIG. 1 is a diagram schematically illustrating a particle discrimination mechanism according to an embodiment of the present invention.

FIG. 1 is a diagram schematically illustrating a particle discrimination mechanism 1 according to the present embodiment. The particle discrimination mechanism 1 according to the present embodiment is an apparatus that discriminates two types of nanoparticles using a microchannel and two types of lasers, and concentrates and collects one of the nanoparticle. Here, the two types of nanoparticles refer to, for example, nanoparticles having surfaces whose scientific properties and physical properties (such as masses) are common (not different). In the present embodiment, one of the nanoparticles is a first nanoparticle that includes an absorber having a predetermined absorption level, and the other particle is a second nanoparticle that does not include the above-described absorber having the predetermined absorption level. More specifically, the first nanoparticle of the present embodiment is a nanodiamond including an NV center, which is the absorber having the predetermined absorption level, and the second nanoparticle is a nanodiamond not including the NV center which is the absorber having the predetermined absorption level.

The nanodiamond including the NV center is highly valuable as an element in the quantum information technology and a highly sensitive sensing material including bioapplications, but a ratio of the nanodiamonds to all produced nanodiamonds is extremely low, and it is difficult to suitably collect only the nanodiamonds including the NV centers. Therefore, it is required to discriminate the nanodiamonds including the NV centers from the produced nanodiamonds, and concentrate and collect the nanodiamonds. The nanodiamond including the NV center and the nanodiamond not including the NV center have surfaces whose scientific and physical properties are common (not different), and thus, it is difficult to discriminate the nanodiamonds by a general centrifugal separation method, chromatography, or the like. In this regard, in the particle discrimination mechanism 1 according to the present embodiment, the nanodiamonds including the NV centers, which are the first nanoparticles, and the nanodiamonds not including the NV centers, which are the second nanoparticles, are transported to different regions to be discriminated by using the micro-channel and the two types of lasers, thereby concentrating and collecting the nanodiamonds including the NV centers. More specifically, the first nanoparticles are irradiated with light resonating with electron transition of the first nanoparticles to enhance radiation forces of the first nanoparticles, thereby transporting the first nanoparticles to a region different from that of the second nanoparticles. Hereinafter, the nanodiamonds including the NV centers may be referred to as resonant particles, and the nanodiamonds not including the NV centers may be referred to as non-resonant particles.

As illustrated in FIG. 1, the particle discrimination mechanism 1 includes a recirculation apparatus 100, a laser 2 (a first light source module), a laser 3 (a second light source module), and a controller 200. The recirculation apparatus 100 includes a channel 4, a reflecting mirror 61 (a first mirror), a half mirror 62 (a second mirror), and a reflecting mirror 63 (a third mirror).

The channel 4 is a channel in which a plurality of resonant particles (for example, the nanodiamonds including the NV centers) and a plurality of non-resonant particles (for example, the nanodiamonds not including the NV centers) exist, the channel including a first input section 51 and a second input section 53. The first input section 51 is an input portion of light emitted from the laser 2 (details will be described later). The second input section 53 is an input portion of light emitted from the laser 3 (details will be described later). The channel 4 includes a first portion 10, a second portion 20, a third portion 30, and a fourth portion 40.

The first portion 10 is a portion extending from the first input section 51 to a first junction 52 in a first direction (a direction extending from left to right in FIG. 1). The second portion 20 is a portion extending from the first junction 52 to the second input section 53 in a second direction (a direction extending from the lower side to the upper side in FIG. 1) intersecting the first direction. The third portion 30 is a portion extending from the second input section 53 to a second junction 54 in the first direction and in a direction approaching the first input section 51 in the first direction (a direction extending from right to left in FIG. 1). The fourth portion 40 is a portion extending from the second junction 54 to a third junction 55 included in the first portion 10. In this manner, a portion having a ring structure returning from the third junction 55 to the third junction 55 via the first junction 52, the second input section 53, and the second junction 54 is formed in the channel 4. Each of sides of the ring structure may be, for example, about several µm to several hundred µm. The sides of the ring structure are a portion from the third junction 55 to the first junction 52 in the first portion 10, the second portion 20, the third portion 30, and the fourth portion 40, respectively. All the sides of the ring structure may have the same length, only the sides facing each other may have the same length, or the sides may have different lengths.

The reflecting mirror 61 is a mirror that is provided at the first junction 52, reflects first light (resonant light from the laser 2 to be described later) from the first portion 10 toward the second portion 20, and reflects second light (non-resonant light from the laser 3 to be described later) from the second portion 20 toward the first portion 10. The half mirror 62 is a mirror that is provided at the second input section 53 and reflects the first light (the resonant light from the laser 2 to be described later) from the second portion 20 toward the third portion 30. The half mirror 62 transmits the non-resonant light from the laser 3, which will be described later, in a direction of the second portion 20. The reflecting mirror 63 is provided at the second junction 54 and reflects the first light (the resonant light from the laser 2 to be described later) from the third portion 30 toward the fourth portion 40.

The laser 2 outputs the resonant light (the first light) absorbed by the NV center which is the absorber having the predetermined absorption level in a direction from the first input section 51 toward the second input section 53 (specifically, a direction from the first input section 51 toward the first junction 52). The laser 3 outputs the non-resonant light (the second light), which is not absorbed by the NV center but is scattered or absorbed by at least the non-resonant particle as the second nanoparticle not including the NV center, in a direction from the second input section 53 toward the first input section 51 (specifically, a direction from the second input section 53 toward the first junction 52).

Figure 2:
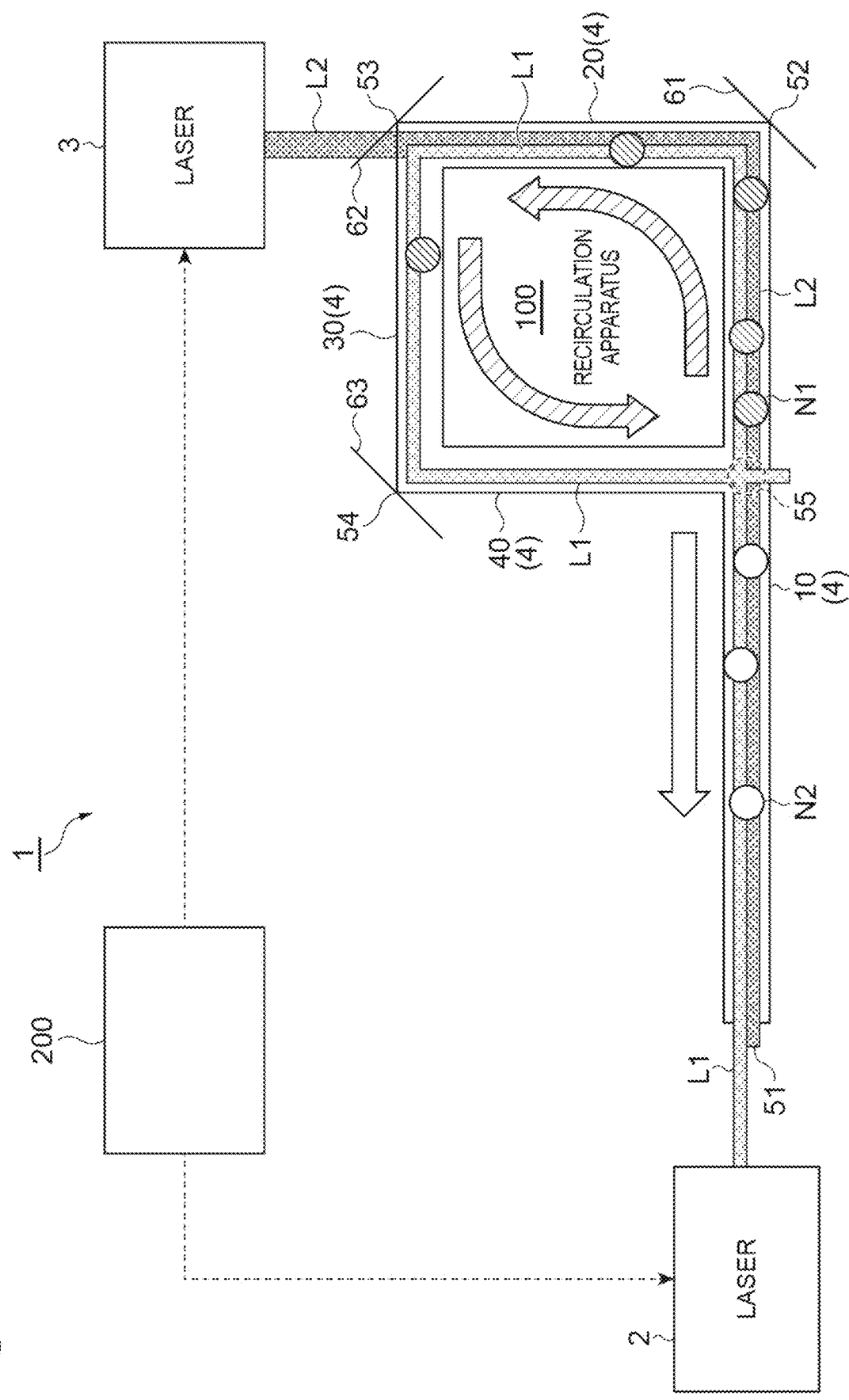
FIG. 2 is a diagram for describing particle discrimination using the particle discrimination mechanism of FIG. 1.

FIG. 2 is a diagram for describing particle discrimination using the particle discrimination mechanism 1 of FIG. 1. As illustrated in FIG. 2, resonant light L1 output from the laser 2 is input from the first input section 51, passes through the first portion 10, is reflected by the reflecting mirror 61, passes through the second portion 20, is further reflected by the half mirror 62, passes through the third portion 30, is further reflected by the reflecting mirror 63, passes through the fourth portion 40, and reaches the third junction 55. In addition, non-resonant light L2 output from the laser 3 is input from the second input section 53, passes through the second portion 20, is reflected by the reflecting mirror 61, passes through the first portion 10, and reaches the first input section 51.

The resonant light L1 is light that is absorbed by a NV center of a resonant particle N1. Thus, the resonant particle N1 is easily transported in a direction of the resonant light L1 by the resonant light L1. In addition, the non-resonant light L2 is light that is scattered or absorbed by the non-resonant particle. Thus, a non-resonant particle N2 is easily transported in a direction of the non-resonant light L2 by the non-resonant light L2. Then, the resonant light L1 and the non-resonant light L2 pass through the first portion 10 and the second portion 20 in directions opposite to each other, and thus, it is possible to transport and discriminate the resonant particle N1 and the non-resonant particle N2 in directions different from each other using such a difference between the directions of the resonant light L1 and the non-resonant light L2.

Here, the resonant particle N1 is irradiated with not only the resonant light L1 but also the non-resonant light L2. The non-resonant light L2 is likely to be scattered in the resonant particle N1, and such scattering is likely to cause the resonant particle N1 to be transported in the direction of the non-resonant light L2. In addition, the non-resonant particle N2 is irradiated with not only the non-resonant light L2 but also the resonant light L1. The resonant light L1 is not absorbed by the non-resonant particle N2, but is likely to be scattered in the non-resonant particle N2, and such scattering is likely to cause the non-resonant particle N2 to be transported in the direction of the resonant light L1. That is, for example, in the first portion 10, the resonant particle N1 is irradiated with not only the resonant light L1 related to absorption but also the non-resonant light L2 in the opposite direction, and the non-resonant particle N2 is irradiated with not only the non-resonant light L2 but also the resonant light L1 in the opposite direction. Thus, in a case where the resonant light L1 and the non-resonant light L2 are not controlled at all, there is a possibility that it is difficult to implement the above-described desired transport and discrimination. In addition, in a case where particles are transported by the resonant light L1 and the non-resonant light L2, transport distances by these beams of light need to be sufficiently larger than movement distances by the Brownian motion which is random motion (dispersion) of the particles. That is, the resonant light L1 and the non-resonant light L2 need to be controlled such that the transport of particles can be distinguished from that by the Brownian motion. The controller 200 is configured to control the resonant light L1 and the non-resonant light L2 as described above.

The controller 200 controls light outputs of the laser 2 and the laser 3. The controller 200 controls the laser 2 and the laser 3 to adjust intensities and frequencies of the resonant light L1 and the non-resonant light L2 such that the resonant particle N1 is transported in the direction from the first input section 51 toward the second input section 53 and the non-resonant particle N2 is transported in the direction from the second input section 53 toward the first input section 51.

The controller 200 controls the laser 2 and the laser 3 to adjust the intensities and frequencies of the resonant light L1 and the non-resonant light L2 such that transport distances of the particles by the resonant light L1 and the non-resonant light L2 become sufficiently larger than dispersion distances of the particles by the Brownian motion. A transport distance $X_h$ of a particle by light is expressed by the following Formula (1). In addition, a dispersion distance $X_d$ by the Brownian motion is expressed by the following Formula (2). In the following Formulas (1) and (2), η represents a viscosity coefficient, $k_B$ represents a Boltzmann constant ($1.38 \times 10^{-23}$), r represents a particle diameter, T represents a temperature, F represents a radiation force applied to a particle by light, and t represents time. As an example, the viscosity coefficient η is $0.89 \times 10^{-3}$ [Pa·s], the particle diameter r is 20.0 [nm], and the temperature T is 300 [K].

[Formula 1]
$$X_h = \frac{F}{6\pi\eta r} t \quad (1)$$

[Formula 2]
$$X_d = \sqrt{\frac{k_B T t}{3\pi\eta r}} \quad (2)$$

A conditional expression for making the transport distance $X_h$ sufficiently larger than the dispersion distance $X_d$ is expressed by, for example, the following Formula (3).

[Formula 3]
$$X_h - X_d > X_d \Leftrightarrow \frac{X_h - X_d}{X_d} > 1 \Leftrightarrow \frac{X_h}{X_d} > 2 \quad (3)$$

The controller 200 adjusts the intensities and frequencies of the resonant light L1 and the non-resonant light L2 such that the radiation force F of the resonant particle N1 and the radiation force F of the non-resonant particle N2 are set to satisfy the above Formula (3).

Figure 3:
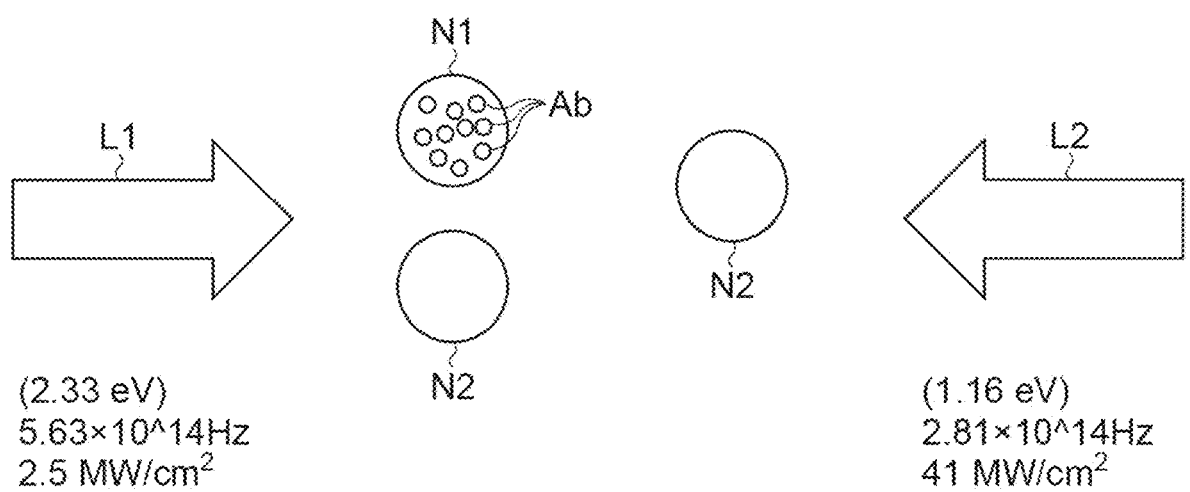
FIG. 3 is a view for describing adjustment of resonant light and non-resonant light.

The controller 200 further controls the laser 2 and the laser 3 to adjust the intensities and frequencies of the resonant light L1 and the non-resonant light L2 such that the resonant particle N1 is transported in the direction of the resonant light L1 and the non-resonant particle N2 is transported in the direction of the non-resonant light L2. First, as illustrated in FIG. 3, the controller 200 adjusts the energy, frequency, and intensity of the resonant light L1 to 2.33 eV, $5.63 \times 10^{14}$ Hz, and 2.5 MW/cm$_2$, respectively, such that the resonant particle N1 can be transported in the direction of the resonant light L1 (can be transported even in consideration of the Brownian motion). In this case, for example, in a resonant particle N1 including 10 NV centers Ab as absorbers, a radiation force (for example, F=$6.2 \times 10^{-2}$ [fN]) due to scattering in a matrix of the resonant particle N1 is larger than a radiation force (for example, F=$6.4 \times 10^{-1}$ [fN]) due to absorption by the NV centers Ab. The controller 200 sets a radiation force due to scattering of the non-resonant light L2 traveling in the opposite direction of the resonant light L1 such that the radiation force due to scattering of the resonant light L1 with respect to the matrix is canceled in the resonant particle N1. As a result, the radiation force due to absorption by the NV centers Ab becomes dominant, and the resonant particle N1 is transported in the direction of the resonant light L1. Then, as illustrated in FIG. 3, the controller 200 adjusts the energy, frequency, and intensity of the non-resonant light L2 to 1.16 eV, $2.81 \times 10^{14}$ Hz, 41 MW/cm$_2$, respectively, for example, such that the radiation force due to scattering of the resonant light L1 with respect to the matrix of the resonant particle N1 is canceled and the non-resonant particle N2 can be transported in the direction of the non-resonant light L2 even in a case where the Brownian motion and the influence of the resonant light L1 are considered. As described above, the controller 200 adjusts the intensities and frequencies of the resonant light L1 and the non-resonant light L2 emitted in the opposite directions in consideration of the Brownian motion to transport the resonant particle N1 in the direction of the resonant light L1 and transport the non-resonant particle N2 in the direction of the non-resonant light L2. Note that the above-described conditions of the resonant light L1 and the non-resonant light L2 are examples, and a combination of an intensity and a wavelength and the like can be freely selected although a resonance frequency (frequency) is limited for each target particle.

Here, the radiation force due to absorption by the NV centers in the resonant particle N1 is significantly smaller than the radiation force due to scattering in the matrix of the resonant particle N1 as described above. In order to transport the resonant particle N1 in the direction of the resonant light L1 by such a small radiation force, the transport by a long distance for a long time is required. That is, a long channel is required in order to extract a difference in movement distance (a difference in the movement distance between the resonant particle N1 and the non-resonant particle N2) by emitting light to all the particles that are dispersed with time.

In addition, in order to collect the discriminated resonant particle N1 and non-resonant particle N2, respectively, it is necessary to clearly separate regions where these exist after the discrimination. In response to such a demand, the recirculation apparatus 100 having the ring structure is adopted as described above to enable repeated transport for a long time by the ring structure, and enable collection of the resonant particles N1 in the ring structure and collection of the resonant particles N1. Then, such discrimination and collection of the resonant particle N1 can be implemented even if the radiation force of the resonant particle N1 is small.

Now, it is assumed that the third junction 55 illustrated in FIG. 2 is an initial position of each particle. Each of the resonant particles N1 is transported in the direction of the resonant light L1 by the radiation force due to absorption at the NV center by the resonant light L1. Therefore, each of the resonant particles N1 is transported so as to repeatedly circulate through the ring structure with the third junction 55 as the initial position. On the other hand, the respective non-resonant particles N2 are affected by diffusion (diffusion or absorption for the non-resonant light L2) of the resonant light L1 and the non-resonant light L2 traveling in the mutually opposite directions, and are dispersed and transported, for example, in the direction of the resonant light L1 or the direction of the non-resonant light L2 (the left-right direction from the third junction 55 in FIG. 2).

Figure 4:
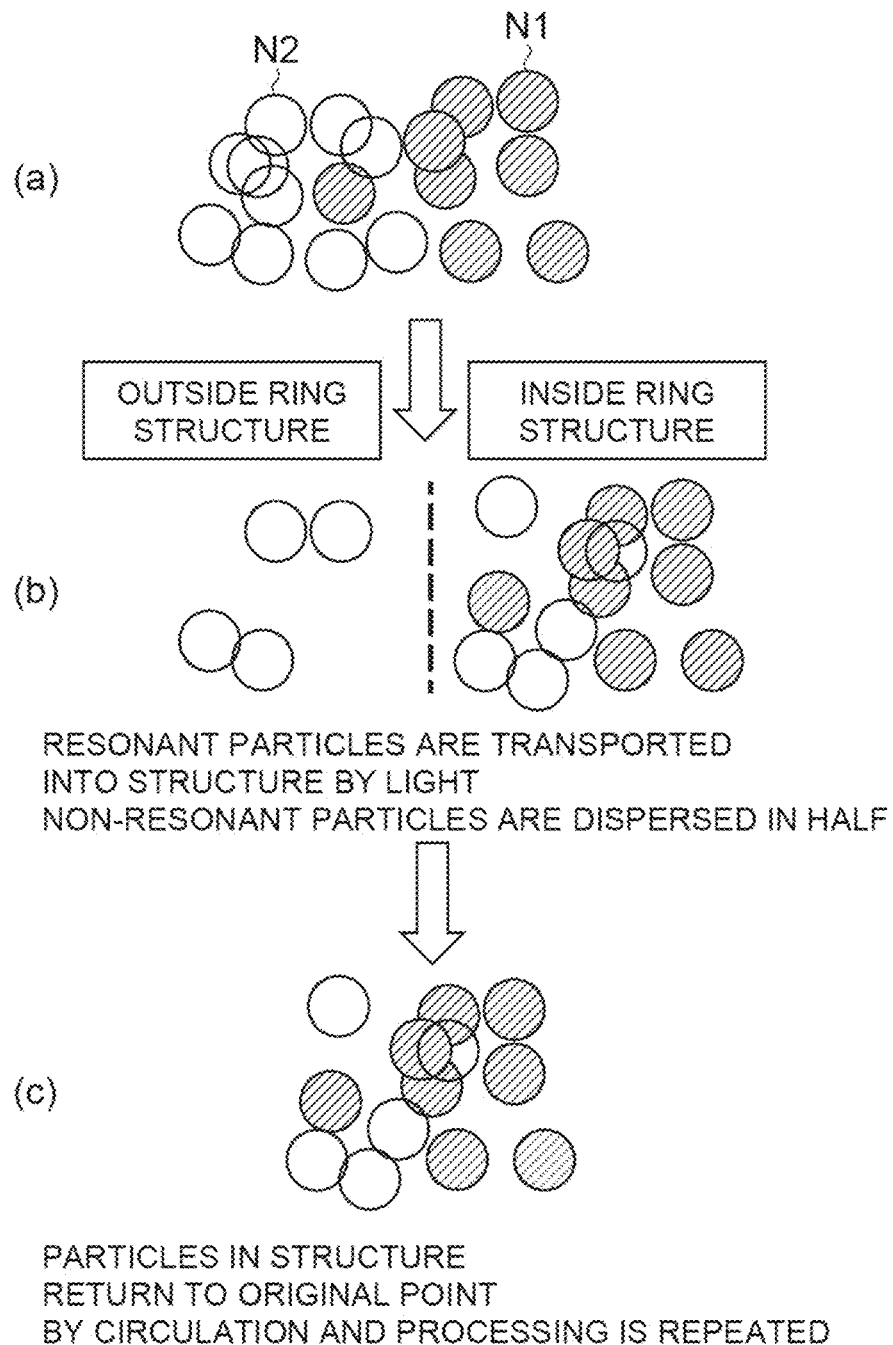
FIG. 4 is a view for describing particle concentration using a ring structure.

FIG. 4 is a view for describing particle concentration using a ring structure. Herein, it is assumed that the non-resonant particles N2 are dispersed in the left-right direction at the same ratio from the third junction 55 which is an initial position. In this case, when a plurality of resonant particles N1 and a plurality of non-resonant particles N2 are released to the third junction 55 which is the initial position as illustrated in FIG. 4(a), the respective resonant particles N1 are transported into the ring structure by the resonant light L1 as illustrated in FIG. 4(b). On the other hand, as illustrated in FIG. 4(b), the respective non-resonant particles N2 are dispersed in half and transported to the inside of the ring structure and the outside of the ring structure. Then, as illustrated in FIG. 4(c), only the resonant particles N1 and the non-resonant particles N2 in the ring structure circulate in the ring structure, return to the third junction again, the respective resonant particles N1 are transported into the ring structure, and the respective non-resonant particles N2 are dispersed in half and transported to the inside of the ring structure and the outside of the ring structure. The circulation in the ring structure is repeated in this manner, and the number of the resonant particles N1 circulating in the ring structure does not change, whereas the number of the non-resonant particles N2 circulating in the ring structure gradually decreases every time the non-resonant particles N2 circulate. Therefore, when the time for the particles to circulate is sufficiently secured, it is possible to separate locations where the resonant particles N1 and the non-resonant particles N2 exist inside and outside the ring structure, and easily collect the resonant particles N1 in the ring structure.

Next, an effect of the particle concentration using the ring structure will be described with reference to FIGS. 5 to 8. FIGS. 5 to 8 respectively illustrate results according to a lapse of time when 10,000 resonant particles N1 and 10,000 non-resonant particles are transported from an initial position. In FIGS. 5 to 8, (a) is a view illustrating temporal changes in the number of the resonant particles N1 and the number of the non-resonant particles N2 existing on a side in a transport direction by the resonant light L1 with respect to the initial position, and (b) is a view illustrating existence positions of the resonant particles N1 and the non-resonant particles N2 after a lapse of 200,000 steps (2000 [S]). In (a), the horizontal axis represents a step, and the vertical axis represents the number of particles. In (b), the horizontal axis represents left and right positions (distance normalized to 0.5 μm) with the initial position as 0, and the vertical axis represents the number of particles. In (b), "+" side on the horizontal axis is the side in the transport direction by the resonant light L1. Note that it is assumed that the non-resonant particles N2 are dispersed in the left-right direction at the same ratio from the initial position.

Figure 5:
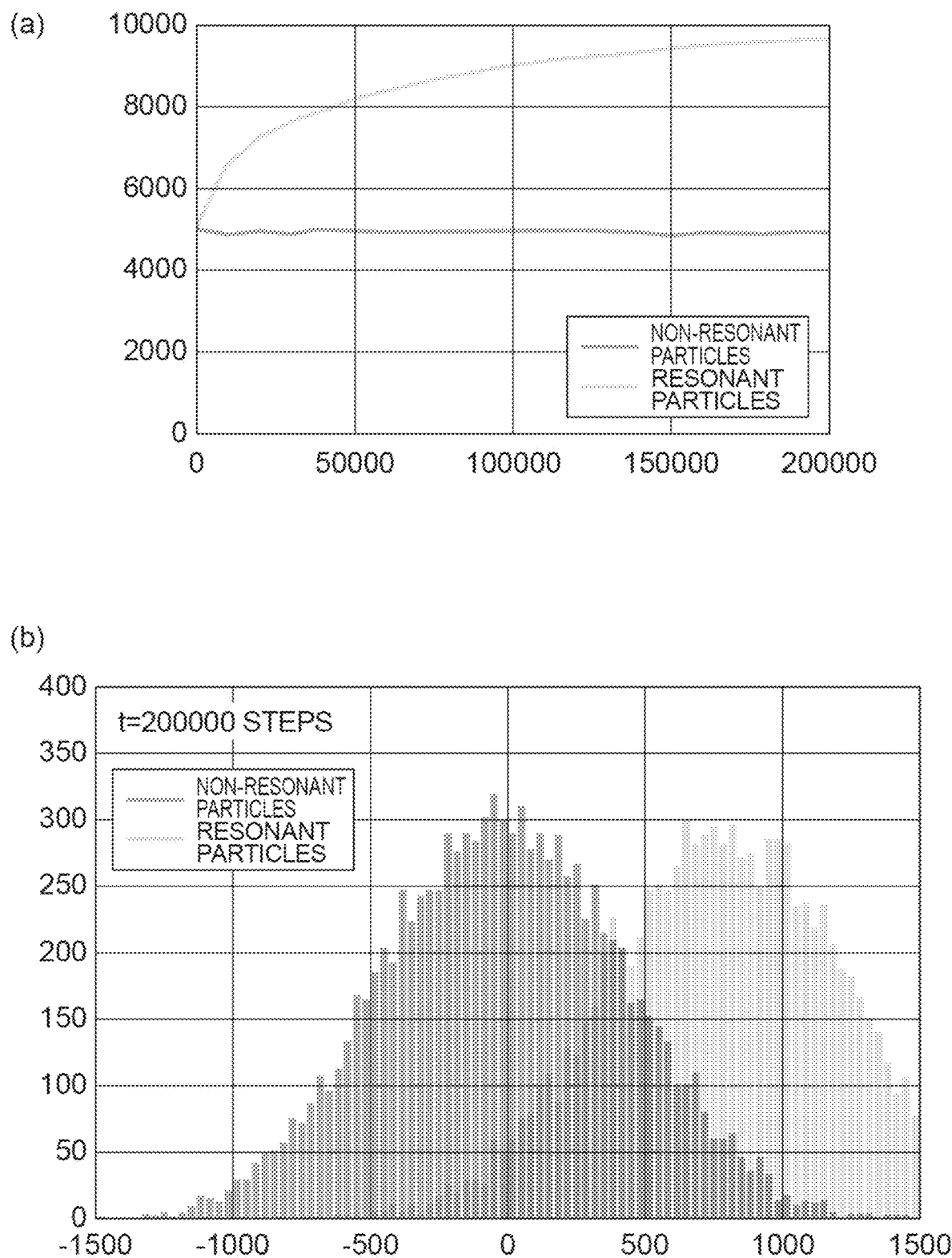
FIG. 5($a$) is a view illustrating temporal changes in the number of resonant particles and the number of non-resonant particles existing on a side in a transport direction by the resonant light with respect to an initial position in a case where there is no ring structure, and FIG. 5($b$) is a view illustrating existence positions of resonant particles and non-resonant particles in 200,000 steps (corresponding to 2000 [s]) in the case where there is no ring structure.

FIG. 5 illustrates a result in a case where there is no ring structure. As illustrated in FIG. 5(a), in the case where there is no ring structure, the number of the resonant particles N1 transported to the side in the transport direction by the resonant light L1 increases with the lapse of time, but the non-resonant particles N2 are dispersed in the left-right direction at the same ratio, and an increase or a decrease in the number of the non-resonant particles N2 transported to the side in the transport direction by the resonant light L1 is small even after the lapse of time. As illustrated in FIG. 5(b), even in a state in which 200,000 steps (2000 [S]) have elapsed and sufficient time has elapsed, the non-resonant particles N2 are dispersed to the left and right at the same ratio, and existence positions of the resonant particles N1 and the non-resonant particles N2 are likely to overlap with each other. In this case, each of the resonant particles N1 and the non-resonant particles N2 cannot be appropriately discriminated, and it becomes difficult to easily collect the resonant particles N1.

Figure 6:
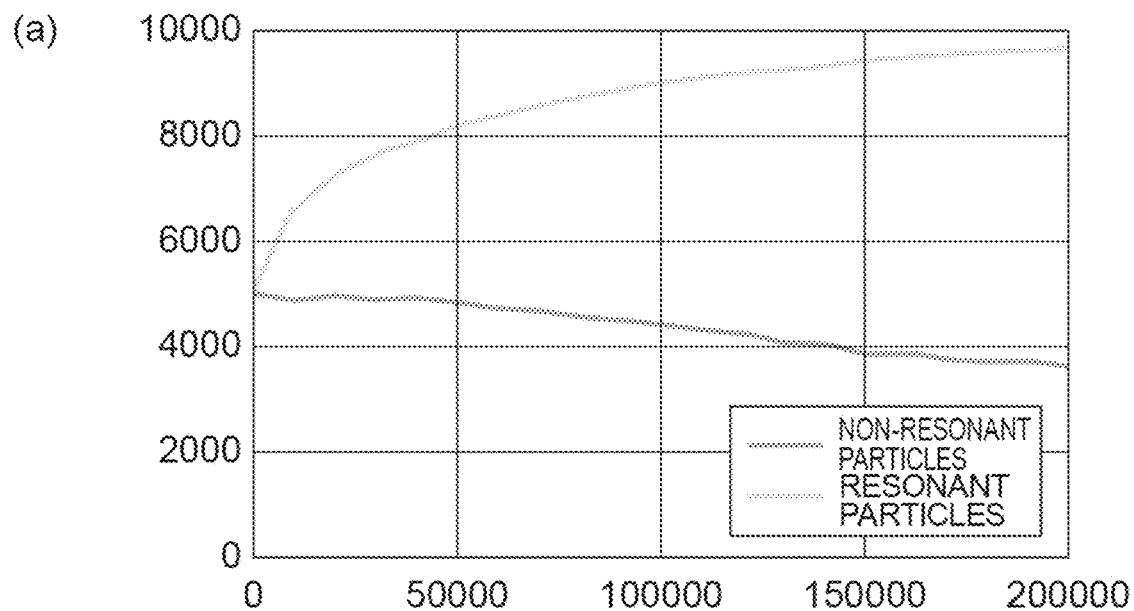
FIG. 6($a$) is a view illustrating temporal changes in the number of resonant particles and the number of non-resonant particles existing on the side in the transport direction by the resonant light with respect to the initial position in a case where one side d of the ring structure is 125 μm, and FIG. 6($b$) is a view illustrating existence positions of resonant particles and non-resonant particles in 200,000 steps in the case where one side d of the ring structure is 125 μm.
Figure 6:
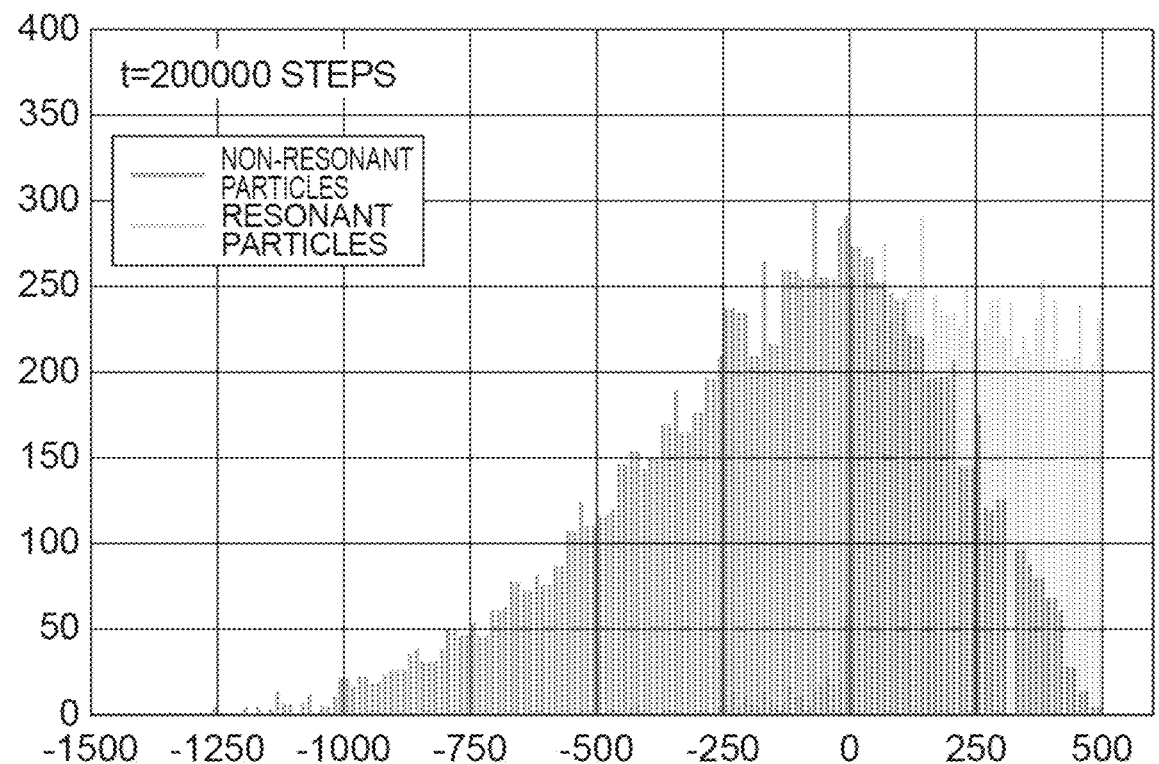

FIG. 6 illustrates a result in a case where there is a ring structure and one side d of the ring structure is 125 μm. Note that a configuration in which there is a ring structure is the configuration of the recirculation apparatus 100 of the particle discrimination mechanism 1 described above (the same applies hereinafter). As illustrated in FIG. 6(a), the presence of the ring structure causes the non-resonant particles N2 to be gradually discharged to the outside of the ring structure every circulation in the ring structure, and thus, the number of the non-resonant particles N2 existing on the side (that is, the ring structure side) in the transport direction by the resonant light L1 decreases with the lapse of time. Therefore, as illustrated in FIG. 6(b), in a state in which 200,000 steps (2000 [S]) have elapsed and sufficient time has elapsed, many non-resonant particles N2 exist on the outer side of the ring structure (on a "−" side on the horizontal axis in FIG. 6(b)), and existence positions of the resonant particles N1 and the non-resonant particles N2 are less likely to overlap with each other. As a result, as compared with the example of FIG. 5, each of the resonant particles N1 and the non-resonant particles N2 can be appropriately discriminated, and the resonant particles N1 can be easily collected.

Figure 7:
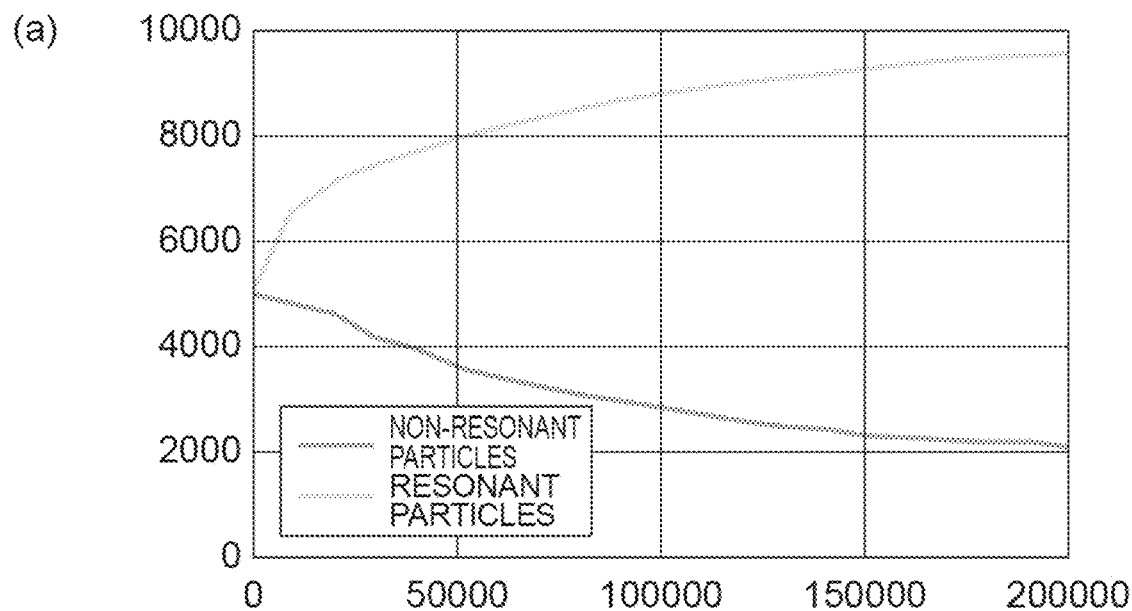
FIG. 7($a$) is a view illustrating temporal changes in the number of resonant particles and the number of non-resonant particles existing on the side in the transport direction by the resonant light with respect to the initial position in a case where one side d of the ring structure is 62.5 μm, and FIG. 7($b$) is a view illustrating existence positions of resonant particles and non-resonant particles in 200,000 steps in the case where one side d of the ring structure is 62.5 μm.
Figure 7:
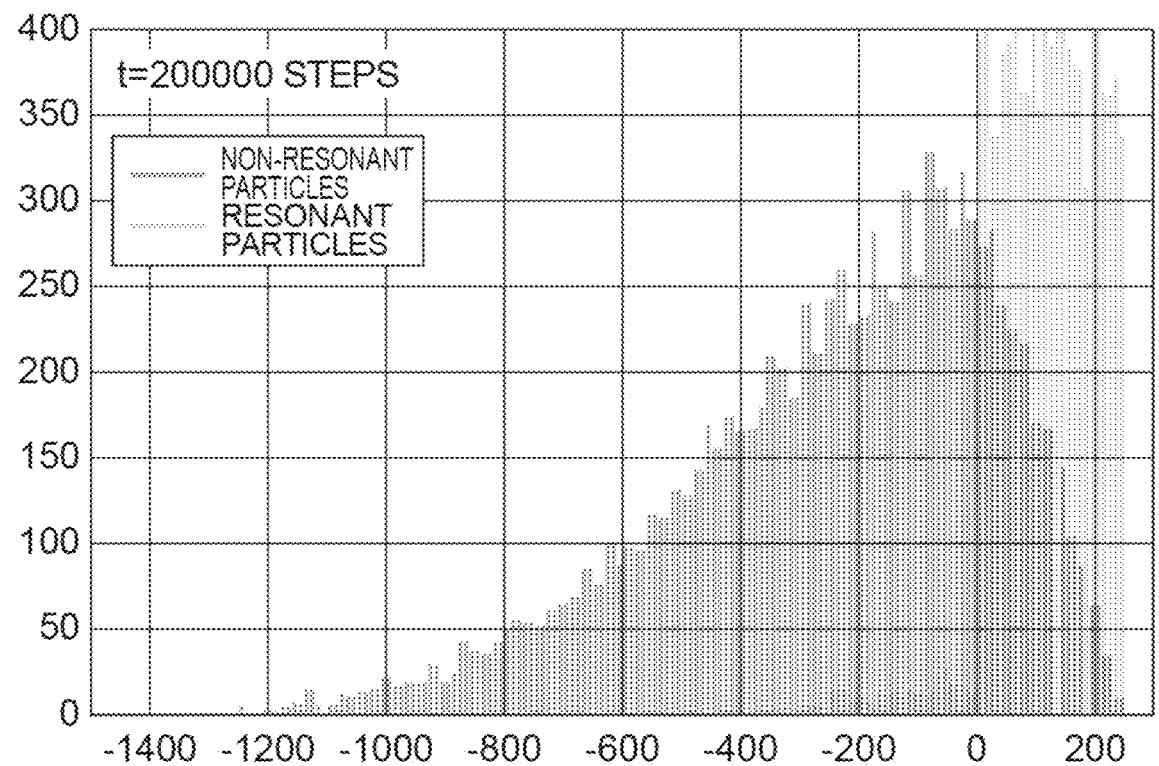

FIG. 7 illustrates a result when there is a ring structure and one side d of the ring structure is 62.5 μm. As the one side d is shortened, a circulation cycle of particles is accelerated, and the opportunity for the non-resonant particles N2 to be discharged to the outside of the ring structure from the third junction 55, which is the initial position, increases. Therefore, as illustrated in FIG. 7(a), the degree of a decrease of the non-resonant particles N2 existing on the ring structure side with the lapse of time is larger than that in the example of FIG. 6 in which one side d of the ring structure is 125 μm. Therefore, as illustrated in FIG. 7(b), in a state in which 200,000 steps (2000 [S]) have elapsed and sufficient time has elapsed, many non-resonant particles N2 exist on the outer side of the ring structure (on a "−" side on the horizontal axis in FIG. 7(b)), and existence positions of the resonant particles N1 and the non-resonant particles N2 are much less likely to overlap with each other. As a result, as compared with the example of FIG. 6, each of the resonant particles N1 and the non-resonant particles N2 can be more appropriately discriminated, and the resonant particles N1 can be more easily collected.

Figure 8:
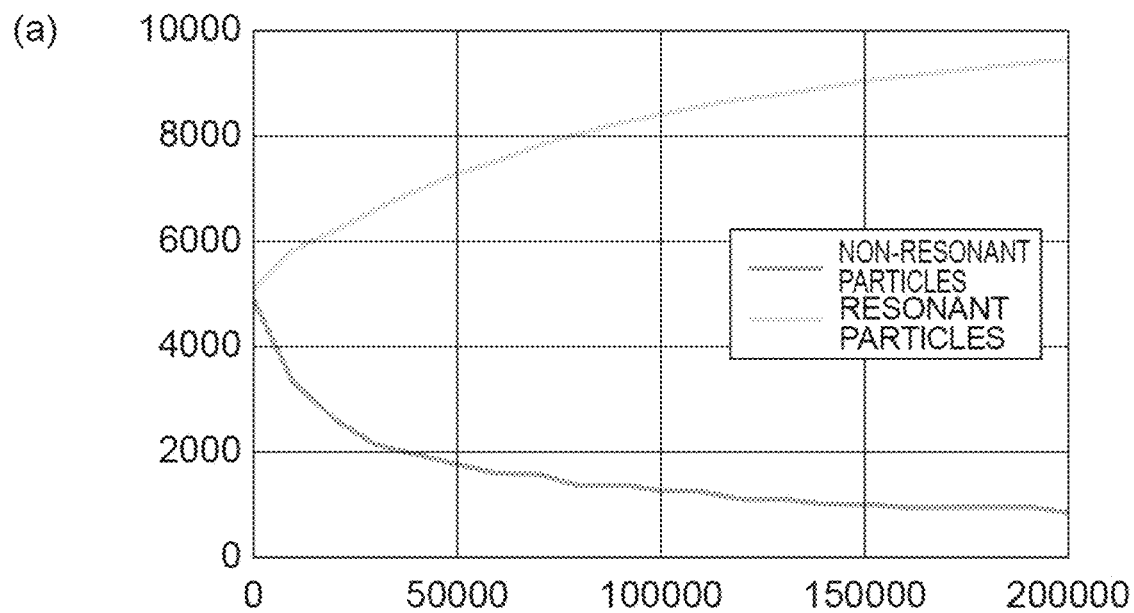
FIG. 8($a$) is a view illustrating temporal changes in the number of resonant particles and the number of non-resonant particles existing on the side in the transport direction by the resonant light with respect to the initial position in a case where one side d of the ring structure is 25 μm, and FIG. 8($b$) is a view illustrating existence positions of resonant particles and non-resonant particles in 200,000 steps in the case where one side d of the ring structure is 25 μm.
Figure 8:
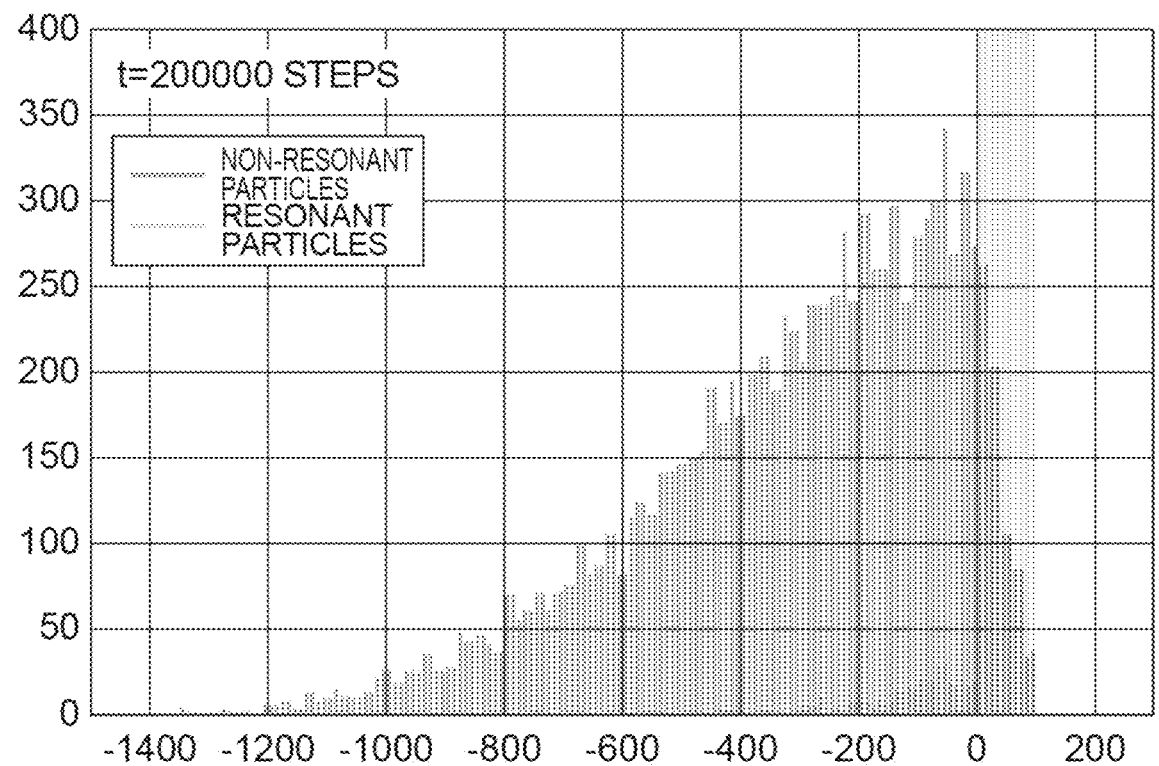

FIG. 8 illustrates a result in a case where there is a ring structure and one side d of the ring structure is 25 μm. As illustrated in FIG. 8(a), as one side d is further shortened, the degree of a decrease of the non-resonant particles N2 existing on the ring structure side with the lapse of time is larger than in the example of FIG. 7 in which one side d of the ring structure is 62.5 μm, and a concentration of the non-resonant particles N2 in the ring structure decreases to about 1/10 of all the non-resonant particles N2 after the lapse of 200,000 steps (2000 [S]). Therefore, as illustrated in FIG. 8(b), in a state in which 200,000 steps (2000 [S]) have elapsed and sufficient time has elapsed, many non-resonant particles N2 exist on the outer side of the ring structure (on a "−" side on the horizontal axis in FIG. 8(b)), and existence positions of the resonant particles N1 and the non-resonant particles N2 are much less likely to overlap with each other. As a result, as compared with the example of FIG. 7, each of the resonant particles N1 and the non-resonant particles N2 can be more appropriately discriminated, and the resonant particles N1 can be more easily collected.

Figure 9:
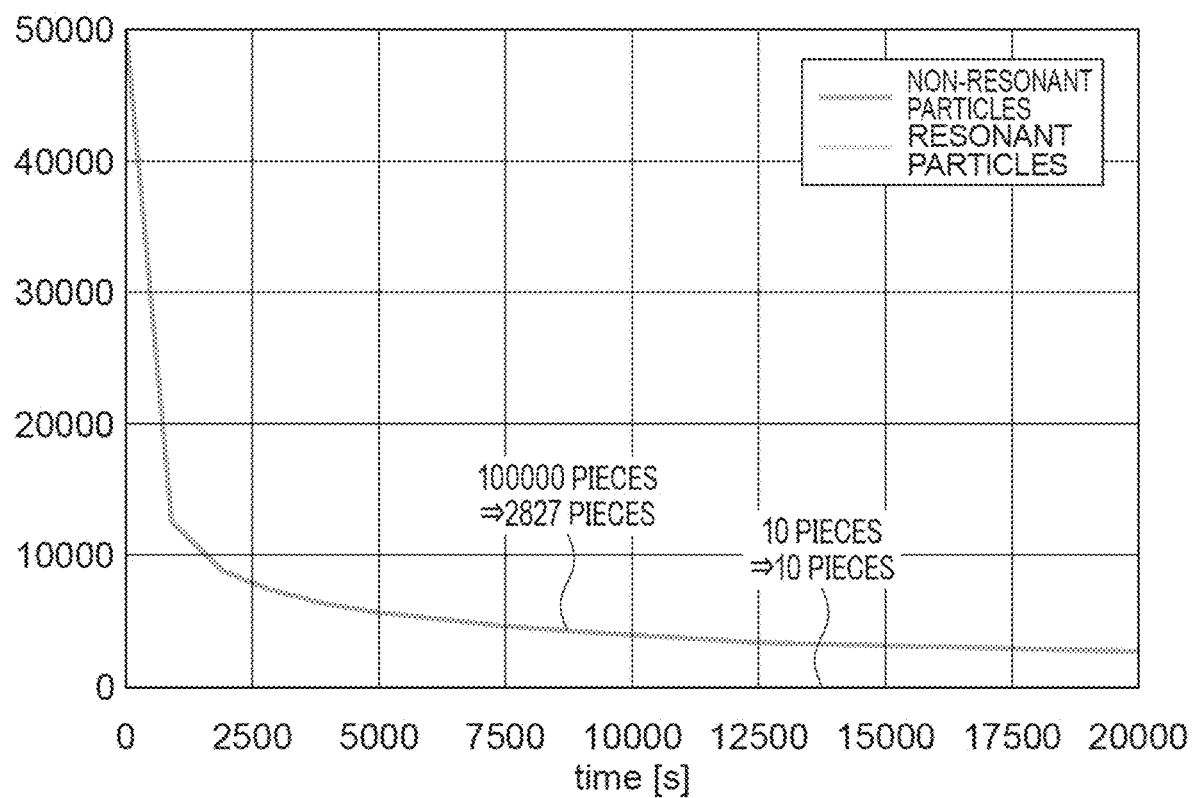
FIG. 9 is a view for describing the usefulness of the particle discrimination mechanism as a concentration mechanism.

FIG. 9 is a view for describing the usefulness of the particle discrimination mechanism 1 as a concentration mechanism. In FIG. 9, the horizontal axis represents time, and the vertical axis represents the number of particles in the ring structure of the channel 4. Herein, in the particle discrimination mechanism 1 having the ring structure, it is assumed that ten resonant particles N1 and 100,000 non-resonant particles N2 are released to the third junction 55 which is an initial position, and the laser 2 emits the resonant light L1 and the laser 3 emits the non-resonant light L2. In this case, as illustrated in FIG. 9, after the lapse of 20,000 [S], the ten resonant particles N1 exist in the ring structure without any change from the initial state, whereas only 2872 non-resonant particles N2 exist in the ring structure. A proportion of the resonant particles N1 to the entire particle was 10/100010≈0.01% before discrimination using the above-described ring structure is performed. On the other hand, after the discrimination using the ring structure is performed (for example, when 200,000 [S] elapses), the proportion of the resonant particles N1 in the ring structure has increased to 10/2837≈0.35%. In this manner, a concentration of the resonant particles N1 in the ring structure could be improved by about 35 times by performing particle circulation for about 5 hours by the particle discrimination mechanism 1 having the ring structure.

Next, an operational effect of the particle discrimination mechanism 1 according to the present embodiment will be described.

The particle discrimination mechanism 1 according to the present embodiment includes: the channel 4 in which a plurality of first nanoparticles each including an absorber having a predetermined absorption level and a plurality of second nanoparticles each of which does not include the absorber having the predetermined absorption level exist, the channel including the first input section 51 and the second input section 53; the laser 2 that outputs first light, which is absorbed by the absorber having the predetermined absorption level, in a direction from the first input section 51 toward the second input section 53; the laser 3 that outputs second light, which is not absorbed by the absorber having the predetermined absorption level but is scattered or absorbed by the second nanoparticles, in a direction from the second input section 53 toward the first input section 51.

With the particle discrimination mechanism 1 according to the present embodiment, the plurality of first nanoparticles each including the absorber having the predetermined absorption level are easily transported in the direction from the first input section 51 toward the second input section 53 by the first light absorbed by the absorber. On the other hand, the plurality of second nanoparticles each of which does not include the absorber having the predetermined absorption level are easily transported in the direction from the second input section 53 toward the first input section 51 by the second light scattered or absorbed by the second nanoparticles. As a result, positions of the first nanoparticles including the absorbers and the second nanoparticles not including the absorbers after the transportation are easily separated, and the first nanoparticles and the second nanoparticles can be appropriately discriminated. Such a discrimination method can also be carried out for two types of particles whose surfaces do not differ from each other in scientific and physical properties. Therefore, with the particle discrimination mechanism 1 according to the present embodiment, it is possible to appropriately discriminate the two types of particles whose surfaces do not differ from each other in scientific and physical properties.

The particle discrimination mechanism 1 may further include the controller 200 that controls light outputs of the laser 2 and the laser 3, and the controller 200 may control the laser 2 and the laser 3 so as to adjust intensities and frequencies of the first light and the second light such that the first nanoparticles are transported in the direction from the first input section 51 toward the second input section 53 and the second nanoparticles are transported in the direction from the second input section 53 toward the first input section 51. The first nanoparticles and the second nanoparticles can be more reliably discriminated by adjusting the intensity and frequency of each beam of the light in this manner.

The channel 4 may include: the first portion 10 extending from the first input section 51 to the first junction 52 in a first direction; the second portion 20 extending from the first junction 52 to the second input section 53 in a second direction intersecting the first direction; the third portion 30 extending from the second input section 53 to the second junction 54 in the first direction and in a direction approaching the first input section 51 in the first direction; the fourth portion 40 extending from the second junction 54 to the third junction 55 included in the first portion 10; the reflecting mirror 61 that is provided at the first junction 52, reflects the first light from the first portion 10 toward the second portion 20, and reflects the second light from the second portion 20 toward the first portion 10; the half mirror 62 that is provided at the second input section 53 and reflects the first light from the second portion 20 toward the third portion 30; and the reflecting mirror 63 that is provided at the second junction 54 and reflects the first light from the third portion 30 toward the fourth portion 40.

In such a structure, a ring structure is formed by a channel of the first portion 10 extending from the third junction 55 to the first junction 52, a channel of the second portion 20 extending from the first junction 52 to the second input section 53, a channel of the third portion 30 extending from the second input section 53 to the second junction 54, and a channel of the fourth portion 40 extending from the second junction 54 to the third junction 55. Then, the first light and the second light pass through the first portion 10 and the second portion 20 in directions opposite to each other, and only the first light passes through the third portion 30 and the fourth portion 40. Therefore, the first nanoparticles and the second nanoparticles are transported only by the first light in a channel, which corresponds to the third portion 30 and the fourth portion 40, from the second input section 53 to the third junction 55 via the second junction 54. Then, optical pressures of the first light and the second light traveling in the opposite directions act on the first nanoparticles and the second nanoparticles reaching the third junction 55 (a point included in the first portion 10). Here, since the first light is absorbed by the absorber having the predetermined absorption level and the second light is not absorbed, the first light becomes dominant, and the first nanoparticles are repeatedly transported by the first light in a channel (channel returning from the third junction 55 to the third junction 55 via the first junction 52, the second input section 53, and the second junction 54) having the above-described ring structure. On the other hand, since the second nanoparticles do not include the absorber, the first light is not absorbed, and the first light is not dominant as compared with the first nanoparticles. Thus, particles transported in the direction from the third junction 55 toward the first input section 51 and particles transported in the channel having the ring structure exist together. However, when reaching the third junction 55 again, the second nanoparticles transported in the channel of the ring structure are divided again into particles to be transported in the direction from the third junction 55 toward the first input section 51 and particles to be transported in the channel of the ring structure. Thus, when sufficient time elapses by repeating such processing, most of the second nanoparticles are transported in the direction toward the first input section. That is, the non-resonant particles can be efficiently removed out of the ring structure. Since transport by a long distance for a long time is achieved by the ring structure in this manner, the first nanoparticles can be repeatedly transported in the channel of the ring structure, and the second nanoparticles can be transported to a channel outside the ring structure. Thus, the first nanoparticles and the second nanoparticles can be appropriately discriminated by separating regions where the first nanoparticles and the second nanoparticles exist. In addition, since the first nanoparticles are concentrated in the channel (circulating portion) having the ring structure, the first nanoparticles can be easily collected.

The first nanoparticles may be nanodiamonds each of which includes an NV center that is the absorber, and the second nanoparticles may be nanodiamonds each of which does not include the NV center that is the absorber. Since the nanodiamond including the NV center and the nanodiamond not including NV center are discriminated by the particle discrimination mechanism 1 according to the present embodiment, it is possible to appropriately collect the nanodiamond including the NV center, which is highly valuable as an element in the quantum information technology and a highly sensitive sensing material including bioapplications.

Although the embodiment of the present disclosure has been described as above, the present invention is not limited to the above-described embodiment. For example, the first nanoparticle has been described as the "nanodiamond including the NV center", and the second nanoparticle has been described as the "nanodiamond not including the NV center", but the present invention is not limited thereto. For example, the first nanoparticle and the second nanoparticle may be quantum dots having different sizes. In this case, an intensity of resonant light may be, for example, about 1 kW/cm$^2$, and a frequency thereof may be a value depending on a corresponding quantum dot. In addition, the first nanoparticle and the second nanoparticle may be carbon nanotubes. In this case, an intensity of resonant light may be, for example, about 1 MWcm$^2$, and a frequency thereof may be, for example, about $2.4 \times 10^{14}$ Hz.

REFERENCE SIGNS LIST 1 particle discrimination mechanism
2 laser (first light source module)
3 laser (second light source module)
4 channel
10 first portion
20 second portion
30 third portion
40 fourth portion
51 first input section
52 first junction
53 second input section
54 second junction
55 third junction
61 reflecting mirror (first mirror)
62 half mirror (second mirror)
63 reflecting mirror (third mirror)
200 controller
L1 resonant light (first light)
L2 non-resonant light (second light)
N1 resonant particle (first nanoparticle)
N2 non-resonant particle (second nanoparticles

The invention claimed is:

1. A particle discrimination mechanism comprising:
a channel configured to allow existence of a plurality of first nanoparticles each of which includes an absorber having a predetermined absorption level and a plurality of second nanoparticles each of which does not include the absorber having the predetermined absorption level, the channel including a first input section and a second input section;
a first light source module configured to output first light, which is absorbed by the absorber having the predetermined absorption level, in a direction from the first input section toward the second input section;
a second light source module configured to output second light, which is not absorbed by the absorber having the predetermined absorption level but is scattered or absorbed by the second nanoparticles, in a direction from the second input section toward the first input section; and
a controller configured to control light outputs of the first light source module and the second light source module,
wherein the controller controls the first light source module and the second light source module to adjust intensities and frequencies of the first light and the second light in such a manner that the first nanoparticles are transported in the direction from the first input section toward the second input section and the second nanoparticles are transported in the direction from the second input section toward the first input section.

2. The particle discrimination mechanism according to claim 1, wherein
the channel includes:
a first portion extending from the first input section to a first junction in a first direction;

a second portion extending from the first junction to the second input section in a second direction intersecting the first direction;
a third portion extending from the second input section to a second junction in the first direction and in a direction approaching the first input section in the first direction;
a fourth portion extending from the second junction to a third junction included in the first portion;
a first mirror provided at the first junction and configured to reflect the first light from the first portion toward the second portion and reflect the second light from the second portion toward the first portion;
a second mirror provided at the second input section and configured to reflect the first light from the second portion toward the third portion; and
a third mirror provided at the second junction and configured to reflect the first light from the third portion toward the fourth portion.

3. The particle discrimination mechanism according to claim 1, wherein
the first nanoparticles are nanodiamonds each of which includes an NV center that is the absorber, and
the second nanoparticles are nanodiamonds each of which does not include the NV center that is the absorber.

* * * * *